United States Patent [19]

Fujii et al.

[11] Patent Number: 4,708,442

[45] Date of Patent: Nov. 24, 1987

[54] VARIFOCAL LENS SYSTEM

[75] Inventors: Toru Fujii; Hiroshi Takase; Masaki Imaizumi, all of Tokyo, Japan

[73] Assignee: Olympus Optical Co., Ltd., Tokyo, Japan

[21] Appl. No.: 703,540

[22] Filed: Feb. 20, 1985

[30] Foreign Application Priority Data

Feb. 22, 1984 [JP] Japan .................. 59-32222

[51] Int. Cl.$^4$ .................. G02B 15/02; G02B 9/34; G02B 9/60

[52] U.S. Cl. .................. 350/422; 350/465; 350/469

[58] Field of Search .................. 350/422, 465, 469

[56] References Cited

U.S. PATENT DOCUMENTS

| 4,146,305 | 3/1979 | Tanaka | 350/422 |
| 4,157,211 | 6/1979 | Tanaka et al. | 350/422 |
| 4,596,447 | 6/1986 | Yamada et al. | 350/422 |

FOREIGN PATENT DOCUMENTS 58-108510 6/1983 Japan .

Primary Examiner—John K. Corbin
Assistant Examiner—Scott J. Sugarman
Attorney, Agent, or Firm—Cushman, Darby & Cushman

[57] ABSTRACT

A varifocal lens system equipped with an auxiliary lens group comprising a master lens system consisting of a front lens group having positive refractive power and a rear lens group having negative refractive power, and an auxiliary lens group arranged in such a manner that it can be freely inserted and removed, for varying focal length, between said front and rear lens groups. Said varifocal lens system is equipped with a simple mechanism capable of varying focal length of said lens system in a very short time.

4 Claims, 8 Drawing Figures

SPHERICAL ABERRATION
F/4.7

-1  1

ASTIGMATISM
24.1° m  s

-1  1

DISTORTION
24.1°

-5 (%) 5

SPHERICAL ABERRATION
F/4.2

-1  1

ASTIGMATISM
28.8° s  m

-1  1

DISTORTION
28.8°

-5 (%) 5

VARIFOCAL LENS SYSTEM

BACKGROUND OF THE INVENTION (a) Field of the invention:

The present invention relates to a varifocal lens system capable of varying focal length of said lens system as a whole by inserting and removing an auxiliary lens group into and out of the optical path of a photographing lens system.

(b) Description of the prior art:

Recently, it is strongly demanded, even for a popular camera designed as an integral unit of a camera body and a photographing lens system, to photograph at wide-position and tele-position, etc. by varying focal length of the photographing lens system. In order to satisfy this demand, it has been proposed to design a photographing lens system for a popular camera as a zoom lens system capable of varying focal length thereof or as a lens system capable of varying focal length by inserting and removing an auxiliary lens into and out of the optical path of a photographing lens system.

As a lens system of the latter type, it has already been known the one disclosed by Japanese published unexamined patent application No. 108510/83. This lens system comprises a front lens group having positive refractive power and a rear lens group having negative refractive power, and designed to vary its focal length by shifting said front lens group toward the object side and inserting an auxiliary lens group having negative refractive power into the airspace formed by shifting said front lens group. However, this lens system has a defect that it requires a long time for varying focal length since said auxiliary lens group can be inserted only after said front lens group has been shifted on the extreme object side.

Further, said lens system requires an undesirably complicated and large mechanism for preventing the front lens group shifting operation from interfering with the auxiliary lens group inserting operation since the cam groove used for shifting the front lens group and the opening for inserting the auxiliary lens group are located nearly at the same location in the lens barrel.

Moreover, this varifocal lens system is set in a long focal length condition when said auxiliary lens group is inserted since it is designed to vary focal length thereof by inserting said auxiliary lens group having negative refractive power. As a result, the paraxial ray is set higher when said auxiliary lens group is inserted than that in the short focal length condition at the same numerical aperture. Accordingly, the paraxial ray incident on said auxiliary lens group is also high, thereby making it difficult to design said auxiliary lens group compact.

SUMMARY OF THE INVENTION

A general object of the present invention is to provide a varifocal lens system comprising a front lens group and a rear lens group, and capable of varying focal length thereof by inserting and removing an auxiliary lens group between said lens groups, said varifocal lens system permitting to design a compact auxiliary lens group, thereby enabling to insert and remove said lens group with a simple mechanism, and to very focal length of said varifocal lens system as a whole in a short time.

The varifocal lens system according to the present invention comprises a master lens system comprising a front lens group having positive refractive power and a rear lens group having negative refractive power, and an auxiliary lens group having positive refractive power and arranged between said front and rear lens groups in such a manner that it can be inserted and removed into and out of optical axis of said master lens system, said varifocal lens system being capable of varying focal length thereof by inserting and removing said auxiliary lens group.

Since the front lens group of the master lens system adopted in the varifocal lens system according to the present invention has the positive refractive power, the ray in parallel with the optical axis is converged at the stage to emerge from the front lens group. Therefore, converging ray is incident on the auxiliary lens group when it is inserted between the front and rear lens groups. Since the auxiliary lens group has the positive refractive power, its imaging magnification is smaller than 1 and focal length of the varifocal lens system is shortened by inserting the auxiliary lens group.

When focal length is varied by inserting the auxiliary lens group having the positive refractive power, focal length of the varifocal lens system as a whole is shortened by inserting said auxiliary lens group and, therefore, the paraxial ray in the short focal length condition is lower than that in the long focal length condition at the same numerical aperture by the ratio between the focal lengths. Accordingly, the paraxial ray incident on the auxiliary lens group is lower, thereby making it possible to design the auxiliary lens group sufficiently compact.

Further, the varifocal lens system is so designed as to preliminarily reserve the space required for inserting the auxiliary lens group since it is so designed as to insert the auxiliary lens group having the positive refractive power. Therefore, the varifocal lens system permits inserting the auxiliary lens group without shifting the front lens group.

Moreover, shifting range for the front lens group is different from the inserting/removing position for the auxiliary lens group. Accordingly, the varifocal lens system permits designing the shifting mechanisms for the respective lens groups independently, thereby preventing the shifting mechanisms from having complicated or large composition.

DETAILED DESCRIPTION OF THE PREFERRED EMBODIMENTS

Figure 1:
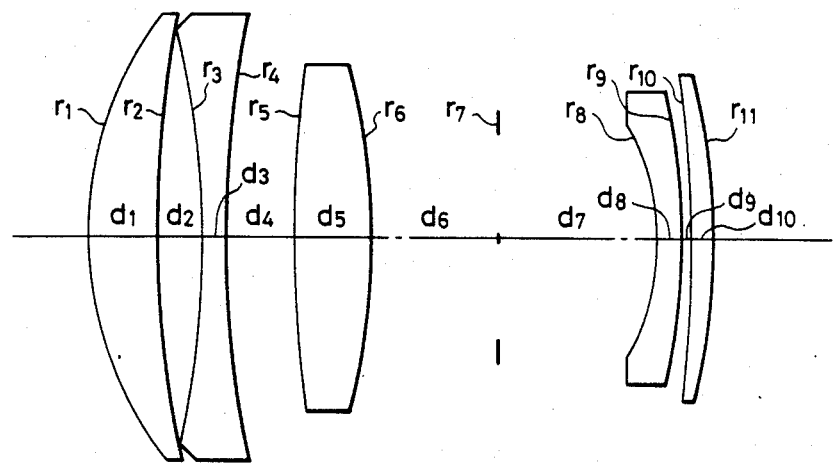
FIG. 1 shows a sectional view illustrating composition of the master lens system of an embodiment 1 of the present invention.
Figure 2:
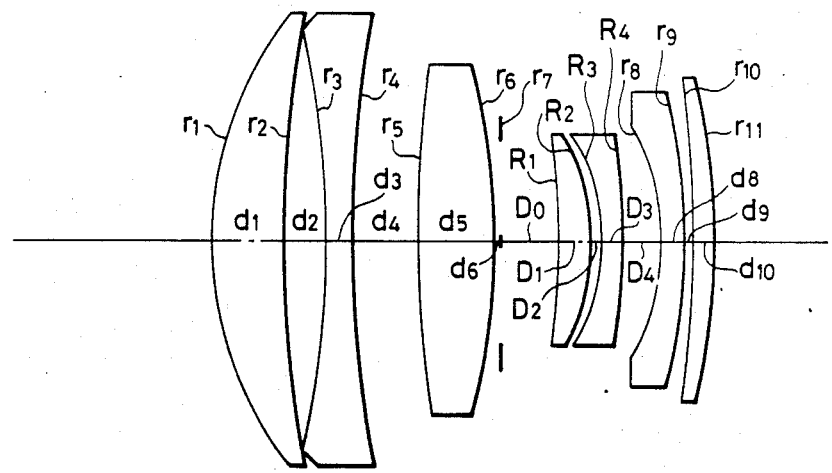
FIG. 2 shows a sectional view illustrating the composition of the master lens system of the Embodiment 1 of the present invention with the auxiliary lens group inserted therein vary focal length thereof.

FIG. 1 and FIG. 2 show sectional views illustrating composition of a lens system preferred as Embodiment 1 of the present invention, FIG. 1 showing a sectional view illustrating composition of a master lens system and FIG. 2 showing a sectional view illustrating composition of said master lens system with said auxiliary lens group inserted therein.

In the master lens system shown in FIG. 1, the front lens group is designed as a triplet type comprising a positive lens component, negative lens component and a positive lens component arranged consecutively from the object side, and the rear lens group comprises a negative lens component having a surface with a small radius of curvature on the object side and a positive lens component having a surface with a small radius of curvature on the image side, said master lens system as a whole having a telephoto type of lens composition. Such a lens composition makes it possible to design a master lens system having a short total length and favorably corrected aberrations.

When the auxiliary lens lens group is inserted into the master lens system, the object point for the rear lens group shifts toward the object side, thereby shortening the back focal length. In this case, the back focal length can be prolonged by shifting the front lens group toward the image side. Therefore, this embodiment is designed in such a manner that, in the condition where the auxiliary lens group is inserted into the master lens system, back focal length of the varifocal lens system made equal to that of the master lens system by shifting the front lens group toward the image side. Since this design makes it possible to vary focal length with the rear lens group and stop which are kept fixed relative to the image surface, the Embodiment 1 is desirable as a varifocal lens system for popular cameras. Further, the Embodiment 1 comprises a small number of movable lens groups and permits simplifying the shifting mechanisms.

Furthermore, since the auxiliary lens group is inserted after the stop, the auxiliary lens group can be arranged in the camera body, thereby making it possible to prevent the camera body from being enlarged. Especially, since each of the lens components of the auxiliary lens group has a size smaller than 70% of that of each lens component arranged in the master lens system, no large space is necessary to accommodate the lens components of the auxiliary lens group in the camera body.

Now, descriptions will be given on aberration correction in the varifocal lens system according to the present invention. Since the auxiliary lens group has the positive refractive power, Petzval's sum of the varifocal lens system as a whole has a large positive value when the auxiliary lens group is inserted into the master lens system. In order to correct the Petzval's sum, it is necessary to arrange negative lens component in the auxiliary lens group. Arrangement of the negative lens component is necessary also for preventing chromatic aberration from being procuced by the auxiliary lens group. Therefore, it is possible to obtain an auxiliary lens group having required refractive power, a suitable Petzval's sum and little chromatic aberration by composing said lens group of at least a positive lens component and a negative lens component. Accordingly, the auxiliary lens group of the Embodiment 1 comprises a positive lens component having a surface with a small radius of curvature on the image side and a negative lens component having a surface with a small radius of curvature on the object side which are arranged from the object side, and meniscus air lens convex on the image side which is arranged between said positive and negative lens components. This air lens serves for preventing high order offaxial aberration from being produced. Paraxial aberration can be corrected by properly adjusting radii of curvature on the two surfaces of the air lens. Further, production of distortion can be suppressed by inserting the auxiliary lens group in the vicinity of the stop.

Figure 5:
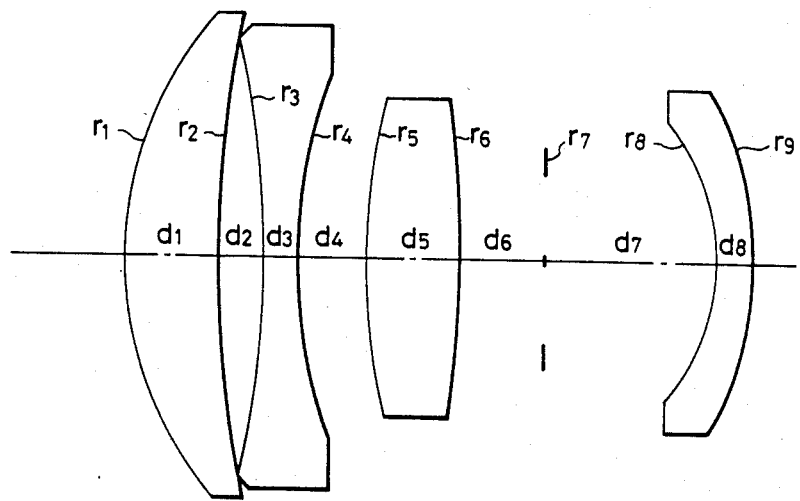
FIG. 5 shows a sectional view illustrating composition of a master lens system preferred as an embodiment 2 of the present invention.
Figure 6:
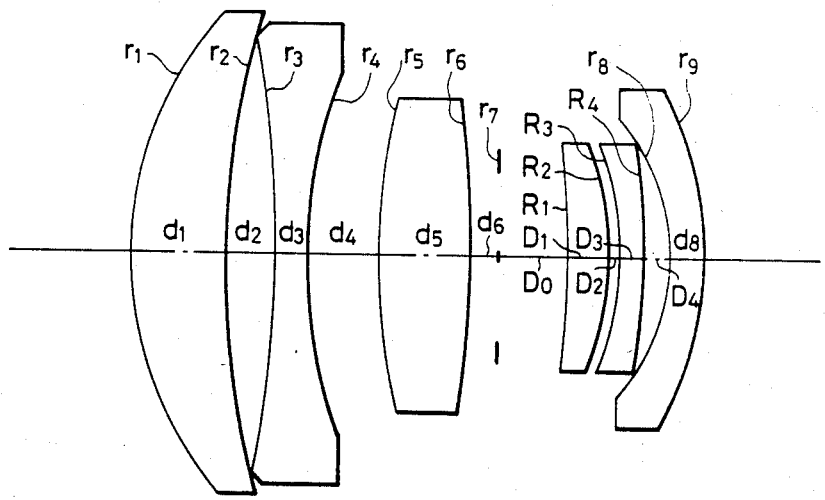
FIG. 6 shows a sectional view illustrating composition of said master lens system of the Embodiment 2 of the present invention with said auxiliary lens system inserted therein.

FIG. 5 and FIG. 6 show Embodiment 2 of the present invention, FIG. 5 showing a sectional view illustrating composition of a master lens system and FIG. 6 showing composition of said master lens system with an auxiliary lens group inserted therein. The Embodiment 2 has basically the same composition as that of the Embodiment 1, except for the rear lens group which comprises a negative lens component only. Accordingly, the Embodiment 2 has almost all the characteristics of the embodiment 1 described above.

Now numerical data of the Embodiments of the varifocal lens system according to the present invention will be described:

EMBODIMENT 1

(Numerical data of the master lens system only)
$f = 57.9 \quad F/4.7$ $r_1 = 14.9797$
$\quad d_1 = 3.0523 \quad n_1 = 1.69680 \quad \nu_1 = 55.52$
$r_2 = 49.9217$
$\quad d_2 = 1.6510$
$r_3 = -43.5413$
$\quad d_3 = 1.1770 \quad n_2 = 1.78472 \quad \nu_2 = 25.71$
$r_4 = 48.9441$
$\quad d_4 = 2.7464$
$r_5 = 63.3544$
$\quad d_5 = 3.1692 \quad n_3 = 1.70154 \quad \nu_3 = 41.24$
$r_6 = -33.4777$
$\quad d_6 = 5.4208$
$r_7 = \infty \text{ (stop)}$
$\quad d_7 = 6.5955$
$r_8 = -10.2276$
$\quad d_8 = 1.0648 \quad n_4 = 1.74320 \quad \nu_4 = 49.31$
$r_9 = -32.0486$
$\quad d_9 = 0.2143$
$r_{10} = -83.8980$
$\quad d_{10} = 1.1000 \quad n_5 = 1.83400 \quad \nu_5 = 37.16$
$r_{11} = -29.0152$ (Numerical data of the master lens system with the auxiliary lens group inserted therein)
$f = 41.4 \quad F/4.2$ $r_1 = 14.9797$
$\quad d_1 = 3.0523 \quad n_1 = 1.69680 \quad \nu_1 = 55.52$
$r_2 = 49.9217$
$\quad d_2 = 1.6510$
$r_3 = -43.5413$
$\quad d_3 = 1.1770 \quad n_2 = 1.78472 \quad \nu_2 = 25.17$
$r_4 = 48.9441$
$\quad d_4 = 2.7464$
$r_5 = 63.3544$
$\quad d_5 = 3.1692 \quad n_3 = 1.70154 \quad \nu_3 = 41.24$
$r_6 = -33.4777$ -continued

| | | |
|---|---|---|
| $d_6 = 0.3413$ | | |
| $r_7 = \infty$ (stop) | | |
| $D_0 = 2.3213$ | | |
| $R_1 = -34.5490$ | | |
| $D_1 = 1.6106$ | $N_1 = 1.88300$ | $V_1 = 40.76$ |
| $R_2 = -8.6019$ | | |
| $D_2 = 0.2000$ | | |
| $R_3 = -7.7600$ | | |
| $D_3 = 0.9386$ | $N_2 = 1.59270$ | $V_2 = 35.29$ |
| $R_4 = -42.9467$ | | |
| $D_4 = 1.5250$ | | |
| $r_8 = -10.2276$ | | |
| $d_8 = 1.0648$ | $n_4 = 1.74320$ | $\nu_4 = 49.31$ |
| $r_9 = -32.0486$ | | |
| $d_9 = 0.2143$ | | |
| $r_{10} = -83.8980$ | | |
| $d_{10} = 1.1000$ | $n_5 = 1.83400$ | $\nu_5 = 37.16$ |
| $r_{11} = -29.0152$ | | |

EMBODIMENT 2

(Numerical data of the master lens system only)
$f = 48.25 \quad F/4.7$

| | | |
|---|---|---|
| $r_1 = 14.9642$ | | |
| $d_1 = 4.0000$ | $n_1 = 1.77250$ | $\nu_1 = 49.7$ |
| $r_2 = 36.5739$ | | |
| $d_2 = 1.9000$ | | |
| $r_3 = -61.4312$ | | |
| $d_3 = 1.5544$ | $n_2 = 1.78472$ | $\nu_2 = 25.7$ |
| $r_4 = 23.3202$ | | |
| $d_4 = 2.8475$ | | |
| $r_5 = 26.1090$ | | |
| $d_5 = 3.9374$ | $n_3 = 1.72343$ | $\nu_3 = 38.0$ |
| $r_6 = -44.2837$ | | |
| $d_6 = 3.5425$ | | |
| $r_7 = \infty$ (stop) | | |
| $d_7 = 7.2363$ | | |
| $r_8 = -8.9494$ | | |
| $d_8 = 1.5544$ | $n_4 = 1.50137$ | $\nu_4 = 56.4$ |
| $r_9 = -14.7718$ | | |

(Numerical data of the master lens system with the auxiliary lens group inserted therein)
$f = 39.33 \quad F/4.2$

| | | |
|---|---|---|
| $r_1 = 14.9642$ | | |
| $d_1 = 4.0000$ | $n_1 = 1.77250$ | $\nu_1 = 49.7$ |
| $r_2 = 36.5739$ | | |
| $d_2 = 1.9000$ | | |
| $r_3 = -61.4312$ | | |
| $d_3 = 1.5544$ | $n_2 = 1.78472$ | $\nu_2 = 25.7$ |
| $r_4 = 23.3202$ | | |
| $d_4 = 2.8475$ | | |
| $r_5 = 26.1090$ | | |
| $d_5 = 3.9374$ | $n_3 = 1.72343$ | $\nu_3 = 38.0$ |
| $r_6 = -44.2837$ | | |
| $d_6 = 1.0601$ | | |
| $r_7 = \infty$ (stop) | | |
| $D_0 = 2.9611$ | | |
| $R_1 = -53.7860$ | | |
| $D_1 = 1.8000$ | $N_1 = 1.88300$ | $V_1 = 40.8$ |
| $R_2 = -13.8202$ | | |
| $D_2 = 0.4000$ | | |
| $R_3 = -14.2392$ | | |
| $D_3 = 0.8000$ | $N_2 = 1.64769$ | $V_2 = 33.8$ |
| $R_4 = -77.5956$ | | |
| $D_4 = 1.2752$ | | |
| $r_8 = -8.9494$ | | |
| $d_8 = 1.5544$ | $n_4 = 1.50137$ | $\nu_4 = 56.4$ |
| $r_9 = -14.7718$ | | | wherein the reference symbols $r_1, r_2, \ldots$ represent radii of curvature on the surfaces of the respective lens elements arranged in the master lens system, the reference symbols $d_1, d_2, \ldots$ designate thicknesses of the respective lens elements of the master lens system and airspaces reserved therebetween, the reference symbols $n_1, n_2, \ldots$ denote refractive indices of the respective lens elements of the master lens system, the reference symbols $\nu_1, \nu_2, \ldots$ represent Abbe's numbers of the respective lens elements of the master lens system, the reference symbols $R_1$ through $R_4$ designate radii of curvature on the surface of the respective lens elements arranged in the auxiliary lens group, the reference symbols $D_1$ through $D_3$ denote thicknesses of the respective lens elements of the auxiliary lens group and airspace reserved therebetween, the reference symbol $D_0$ represents airspace reserved between the stop in the master lens system and auxiliary lens group, the reference symbol $D_4$ designates airspace reserved between the auxiliary lens group and rear lens group, the reference symbols $N_1$ and $N_2$ denote refractive indices of the respective lens elements of the auxiliary lens group, and reference symbols $V_1$ and $V_2$ represent Abbe's numbers of the respective lens elements of the auxiliary lens group.

Figure 3:
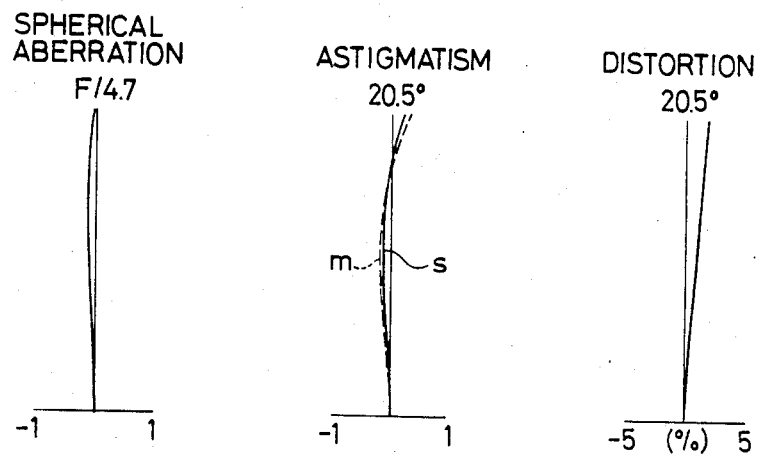
FIG. 3 shows curves illustrating aberration characteristics of said master lens system of the Embodiment 1 of the present invention.
Figure 4:
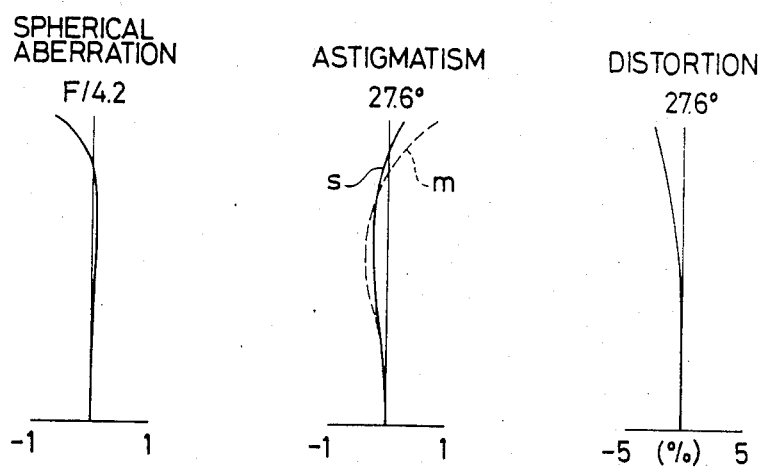
FIG. 4 shows cruves illustrating aberration characteristics of said master lens system of the Embodiment 1 of the present invention with said auxiliary lens group inserted therein.
Figure 7:
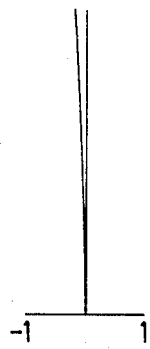
FIG. 7 shows curves illustrating aberration characteristics of the master lens system of the Embodiment 2 of the present invention.
Figure 7:
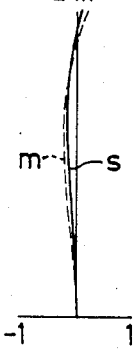
Figure 7:
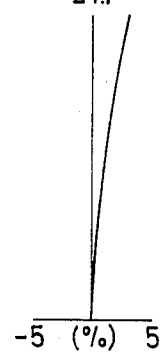
Figure 8:
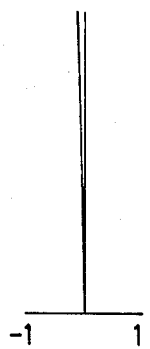
FIG. 8 shows curves illustrating aberration characteristics of said master lens system of the Embodiment 2 of the present invention with said auxiliary lens group inserted therein.
Figure 8:
Figure 8:
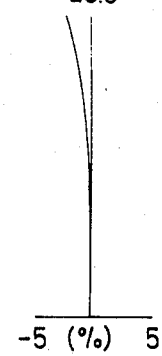

Aberration characteristics of the Embodiment 1 are illustrated in FIG. 3 and FIG. 4. Aberration characteristics of the Embodiment 2 are illustrated in FIG. 7 and FIG. 8. FIG. 3 and FIG. 7 show aberration characteristics of the master lens systems only, whereas FIG. 4 and FIG. 8 show aberration characteristics of the master lens systems with the auxiliary lens groups inserted therein.

Though these embodiments are so designed as to adjust back focal lengths by shifting the front lens groups toward the image side, the rear lens group only may be shifted or both the front and rear lens groups may be shifted simultaneously for adjusting back focal length. By increasing number of lens groups to be shifted, it is possible to vary focal length continuously and enhance flexibility of aberration correction.

The present invention makes it possible to design the auxiliary lens group compact and, accordingly, to design the varifocal lens system very compact as a whole. Further, the present invention makes it possible to easily design a compact shifting mechanism having a simple construction.

Furthermore, the varifocal lens system according to the present invention is capable of inserting the auxiliary lens group in a very short time.

We claim:

1. A varifocal lens system equipped with an auxiliary lens group and comprising a master lens system consisting of a front lens group having positive refractive power and a rear lens group having negative refractive power said groups being relatively movable between first positions corresponding to a long focal length condition and another position where said front lens group is moved toward the image side of the optical path, said auxiliary lens group being removable from the optical path of said master lens system when said master lens system is in said long focal length condition and said auxiliary lens group being insertable between said front and rear lens groups of said master lens system whereupon said front lens group is shifted toward the image side simultaneously with the insertion of said auxiliary lens group.

2. A varifocal lens system equipped with said auxiliary lens group according to claim 1 wherein said auxiliary lens group comprises at least a positive lens component and at least a negative lens component.

3. A varifocal lens system equipped with said auxiliary lens group according to claim 2 wherein said front lens group comprises a positive lens component, a negative lens component and a positive lens component, said rear lens group comprises a negative lens component and a positive lens component, and said auxiliary lens group comprises a positive lens component and a negative lens component, said varifocal lens system having the following numerical data:

(Numerical data of the master lens system only)
$f = 57.9 \quad F/4.7$

| | | |
|---|---|---|
| $r_1 = 14.9797$ | | |
| $d_1 = 3.0523$ | $n_1 = 1.69680$ | $\nu_1 = 55.52$ |
| $r_2 = 49.9217$ | | |
| $d_2 = 1.6510$ | | |
| $r_3 = -43.5413$ | | |
| $d_3 = 1.1770$ | $n_2 = 1.78472$ | $\nu_2 = 25.71$ |
| $r_4 = 48.9441$ | | |
| $d_4 = 2.7464$ | | |
| $r_5 = 63.3544$ | | |
| $d_5 = 3.1692$ | $n_3 = 1.70154$ | $\nu_3 = 41.24$ |
| $r_6 = -33.4777$ | | |
| $d_6 = 5.4208$ | | |
| $r_7 = \infty$ (stop) | | |
| $d_7 = 6.5955$ | | |
| $r_8 = -10.2276$ | | |
| $d_8 = 1.0648$ | $n_4 = 1.74320$ | $\nu_4 = 49.31$ |
| $r_9 = -32.0486$ | | |
| $d_9 = 0.2143$ | | |
| $r_{10} = -83.8980$ | | |
| $d_{10} = 1.1000$ | $n_5 = 1.83400$ | $\nu_5 = 37.16$ |
| $r_{11} = -29.0152$ | | |

(Numerical data of the master lens system with the auxiliary lens group inserted therein)
$f = 41.4 \quad F/4.2$

| | | |
|---|---|---|
| $r_1 = 14.9797$ | | |
| $d_1 = 3.0523$ | $n_1 = 1.69680$ | $\nu_1 = 55.52$ |
| $r_2 = 49.9217$ | | |
| $d_2 = 1.6510$ | | |
| $r_3 = -43.5413$ | | |
| $d_3 = 1.1770$ | $n_2 = 1.78472$ | $\nu_2 = 25.17$ |
| $r_4 = 48.9441$ | | |
| $d_4 = 2.7464$ | | |
| $r_5 = 63.3544$ | | |
| $d_5 = 3.1692$ | $n_3 = 1.70154$ | $\nu_3 = 41.24$ |
| $r_6 = -33.4777$ | | |
| $d_6 = 0.3413$ | | |
| $r_7 = \infty$ (stop) | | |
| $D_0 = 2.3213$ | | |
| $R_1 = -34.5490$ | | |
| $D_1 = 1.6106$ | $N_1 = 1.88300$ | $V_1 = 40.76$ |
| $R_2 = -8.6019$ | | |
| $D_2 = 0.2000$ | | |
| $R_3 = -7.9600$ | | |
| $D_3 = 0.9386$ | $N_2 = 1.59270$ | $V_2 = 35.29$ |
| $R_4 = -42.9467$ | | |
| $D_4 = 1.5250$ | | |
| $r_8 = -10.2276$ | | |
| $d_8 = 1.0648$ | $n_4 = 1.74320$ | $\nu_4 = 49.31$ |
| $r_9 = -32.0486$ | | |
| $d_9 = 0.2143$ | | |
| $r_{10} = -83.8980$ | | |
| $d_{10} = 1.1000$ | $n_5 = 1.83400$ | $\nu_5 = 37.16$ |
| $r_{11} = -29.0152$ | | | wherein the reference symbols $r_1$ through $r_{11}$ represent radii of curvature on the surface of the respective lens elements arranged in the master lens system, the reference symbols $d_1$ through $d_{10}$ designate thicknesses of the respective lens elements of the master lens system and airspaces reserved therebetween, the reference symbols $n_1$ through $n_5$ denote refractive indices of the respective lens elements of the master lens system, the reference symbols $\nu_1$ through $\nu_5$ represent Abbe's numbers of the respective lens elements of the master lens system, the reference symbols $R_1$ through $R_4$ designate radii of curvature on the surface of the respective lens elements arranged in the auxiliary lens group, the reference symbols $D_1$ through $D_3$ denote thicknesses of the respective lens elements of the auxiliary lens group and airspace reserged theretween, the reference symbol $D_0$ represents aidspace reserved between the stop in the master lens system and auxiliary lens group, the reference symbol $D_4$ designates airspace reserved between the auxiliary lens group and rear lens group, the reference symbols $N_1$ and $N_2$ denote refractive indices of the respective lens elements of the auxiliary lens group, and the reference symbols $V_1$ and $V_2$ represent Abbe's numbers of the respective lens elements of the auxiliary lens group.

4. A varifocal lens system equipped with said auxiliary lens group according to claim 2 wherein said front lens group comprises a positive lens component, a negative lens component and a positive lens component, said rear lens group comprises a negative lens component, and said auxiliary lens group comprises a positive lens component and a negative lens component, said varifocal lens system having the following numerical data:

(Numerical data of the master lens system only)
$f = 48.25 \quad F/4.7$

| | | |
|---|---|---|
| $r_1 = 14.9642$ | | |
| $d_1 = 4.0000$ | $n_1 = 1.77250$ | $\nu_1 = 49.7$ |
| $r_2 = 36.5739$ | | |
| $d_2 = 1.9000$ | | |
| $r_3 = -61.4312$ | | |
| $d_3 = 1.5544$ | $n_2 = 1.78472$ | $\nu_2 = 25.7$ |
| $r_4 = 23.3202$ | | |
| $d_4 = 2.8475$ | | |
| $r_5 = 26.1090$ | | |
| $d_5 = 3.9374$ | $n_3 = 1.72343$ | $\nu_3 = 38.0$ |
| $r_6 = -44.2837$ | | |
| $d_6 = 3.5425$ | | |
| $r_7 = \infty$ (stop) | | |
| $d_7 = 7.2363$ | | |
| $r_8 = -8.9494$ | | |
| $d_8 = 1.5544$ | $n_4 = 1.50137$ | $\nu_4 = 56.4$ |
| $r_9 = -14.7718$ | | |

(Numerical data of the master lens system with the auxiliary lens group inserted therein)
$f = 39.33 \quad F/4.2$

| | | |
|---|---|---|
| $r_1 = 14.9642$ | | |
| $d_1 = 4.0000$ | $n_1 = 1.77250$ | $\nu_1 = 49.7$ |
| $r_2 = 36.5739$ | | |
| $d_2 = 1.9000$ | | |
| $r_3 = -61.4312$ | | |
| $d_3 = 1.5544$ | $n_2 = 1.78472$ | $\nu_2 = 25.7$ |
| $r_4 = 23.3202$ | | |
| $d_4 = 2.8475$ | | |
| $r_5 = 26.1090$ | | |
| $d_5 = 3.9374$ | $n_3 = 1.72343$ | $\nu_3 = 38.0$ |
| $r_6 = -44.2837$ | | |
| $d_6 = 1.0601$ | | |
| $r_7 = \infty$ (stop) | | |
| $D_0 = 2.9611$ | | |
| $R_1 = -53.7860$ | | |
| $D_1 = 1.8000$ | $N_1 = 1.88300$ | $V_1 = 40.8$ |
| $R_2 = -13.8202$ | | |
| $D_2 = 0.4000$ | | |
| $R_3 = -14.2392$ | | |
| $D_3 = 0.8000$ | $N_2 = 1.64769$ | $V_2 = 33.8$ |
| $R_4 = -77.5956$ | | |
| $D_4 = 1.2752$ | | |
| $r_8 = -8.9494$ | | |
| $d_8 = 1.5544$ | $n_4 = 1.50137$ | $\nu_4 = 56.4$ |
| $r_9 = -14.7718$ | | | wherein the reference symbols $r_1$ through $r_9$ represent radii of curvature on the surfaces of the respective lens elements arranged in the master lens system, the reference symbols $d_1$ through $d_8$ designate thicknesses of the respective lens elements of the master lens system and airspaces reserved therebetwee, the reference symbols $n_1$ through $n_4$ denote refractive indices of the respective lens elements of the master lens system, the reference symbols $\nu_1$ through $\nu_4$ represent Abbe's numbers of the respective lens elements of the master lens system, the reference symbols $R_1$ through $R_4$ designate radii of curvature on the surface of the respective lens elemetns arranged in the auxiliary lens group, the reference symbols $D_1$ through $D_3$ denote thicknesses of the respective lens elements of the auxiliary lens group and airspace reserved therebetween, the reference symbol $D_0$ represents airspace reserved between the stop in the master lens system and auxiliary lens group, the reference symbol $D_4$ designates airspace reserved between the auxiliary lens group and rear lens group, the reference symbols $N_1$ and $N_2$ denote refractive indices of the respective lens elements of the auxiliary lens group, and the reference symbols $V_1$ and $V_2$ represent Abbe's numbers of the respective lens elements of the auxiliary lens group.

* * * * *